US012710835B2

(12) United States Patent
Scholder

(10) Patent No.: US 12,710,835 B2
(45) Date of Patent: Aug. 18, 2026

(54) HID REPORT RATE INCREASE WHILE KEEPING A LOW POWER CONSUMPTION

(71) Applicant: Logitech Europe S.A., Lausanne (CH)

(72) Inventor: François Scholder, Crissier (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 19/006,955

(22) Filed: Dec. 31, 2024

(65) Prior Publication Data

US 2026/0186590 A1 Jul. 2, 2026

(51) Int. Cl.
*G06F 3/038* (2013.01)
*G06F 3/0354* (2013.01)

(52) U.S. Cl.
CPC .......... *G06F 3/038* (2013.01); *G06F 3/03543* (2013.01); *G06F 3/03547* (2013.01); *G06F 3/03549* (2013.01)

(58) Field of Classification Search
CPC .. G06F 3/038; G06F 3/03543; G06F 3/03547; G06F 3/03549
See application file for complete search history.

(56) References Cited

U.S. PATENT DOCUMENTS 11,093,264 B1* 8/2021 Korobov ............... G06T 11/203
2002/0163502 A1* 11/2002 Kamper .................. G06F 3/038 345/157
2004/0212587 A1* 10/2004 Kong ...................... G06F 3/038 345/156
2006/0168548 A1* 7/2006 Kelley ................ G06F 3/04812 715/857
2009/0060283 A1* 3/2009 Bledsoe ............... H04N 1/1074 382/107
2012/0176309 A1* 7/2012 Yang ...................... G06F 3/038 345/157
2014/0160125 A1* 6/2014 Yoo ....................... G06T 11/203 345/423
2014/0204126 A1* 7/2014 Mankowski ........ G06F 3/03545 345/646
2016/0062470 A1* 3/2016 Pandey .................. G06F 3/017 702/150
2019/0310738 A1* 10/2019 Dyvik ................... G06F 3/0418
2020/0043179 A1* 2/2020 Chauvin .............. G06N 3/0464
2021/0405770 A1* 12/2021 Chauvin ............... G06F 3/0317
2025/0245114 A1* 7/2025 Chauvin ............. G06F 3/03543

* cited by examiner

*Primary Examiner* — Ariel A Balaoing
(74) *Attorney, Agent, or Firm* — Kilpatrick Townsend & Stockton LLP

(57) ABSTRACT

A method and apparatus for wireless communications between a displacement input device and a host. Instead of using actual displacements from the displacement input device, projected positions are used for display. A slower rate of displacements from the displacement input device are transmitted, saving power, while the host determines, from the state of the displacement input device (e.g., position and velocity) where to predict future positions before the next measured displacement is received from the displacement input device.

14 Claims, 13 Drawing Sheets

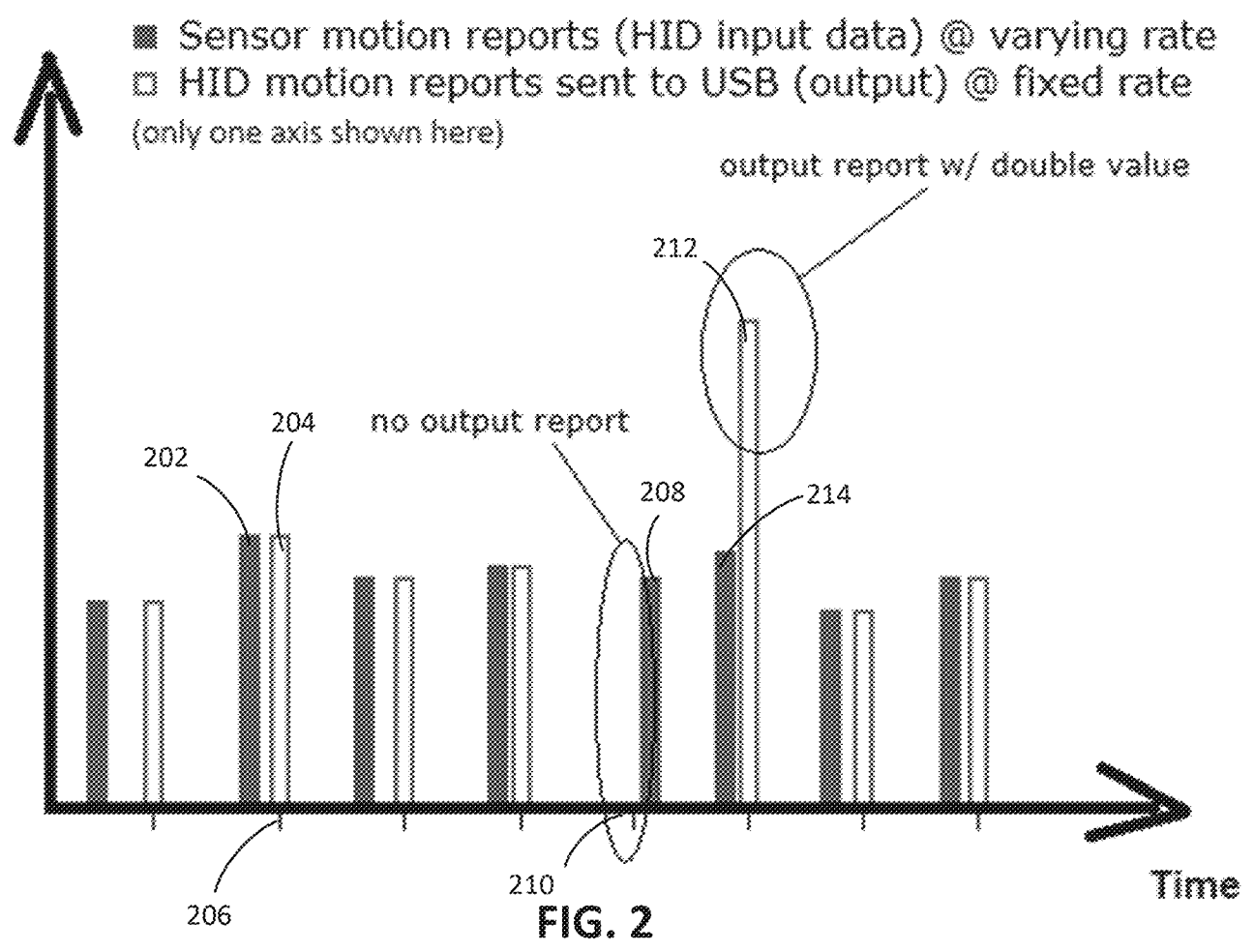

■ Sensor motion reports (HID input data) @ varying rate
□ HID motion reports sent to USB (output) @ fixed rate
(only one axis shown here)

output report w/ double value no output report 202
204
206
208
210
212
214

Time

FIG. 2

HID REPORT RATE INCREASE WHILE KEEPING A LOW POWER CONSUMPTION

FIELD

The described embodiments relate generally to Human Interface Devices (HID)—in particular displacement input devices such as computer mice, joysticks or trackballs—in communication with a host device over a communication interface (e.g., USB via a wireless receiver, such as a dongle). More particularly, the present embodiments relate to increasing an HID report rate while limiting power consumption.

BACKGROUND

Displacement input devices, such as computer mice or joysticks, send a standard packet to a host, chosen and initialized upon connection to a host in accordance with a communication protocol, with fields for button presses, displacement movement, etc. In recent years, there has been a trend for increased report rates (temporal resolution), in particular in gaming computer mice. So far, this trend has been addressed by sensor or mouse manufacturers with a brute-force approach: the minimum flash rate of the 2D tracking sensor in mice is increased from a typical 1 kHz value to 2, 4, or even 8 kHz, which increases the sensor power consumption by typically the same factor at mid and low speeds, and also makes the motion calculation less precise at those speeds because the displacements between consecutive images captured by the sensor get smaller and smaller, and thus noisier and noisier.

Spatial resolutions (DPI) offered in gaming mice have been increased tenfold in the past decade, from 3,200 DPI to 32,000 DPI or more, requiring finer and finer sub-pixel interpolation in the correlation algorithms. This, however, is typically achieved at the cost of a higher noise in the least significant bits of the mouse motion reports (DeltaX & DeltaY).

It would be desirable to increase the report rate without increasing power consumption. Unless otherwise indicated herein, the materials described in this section are not admitted to be prior art by inclusion in this section.

BRIEF SUMMARY OF THE INVENTION

In certain embodiments, instead of using actual displacements from a displacement input device, projected positions are used for display. A slower rate of displacements from the displacement input device are transmitted, saving power, while the host determines, from the state of the displacement input device (absolute or relative position, velocity, acceleration, etc.) where to predict and display future positions before the next measured displacement is received from the displacement input device.

In certain embodiments, a method for communications between a displacement input device and a host is provided. The host receives a displacement from the displacement input device. The host determines projected future positions for the displacement input device at multiple future times. The host displays on a host display the projected future positions at the multiple future times. The host receives an updated displacement from the displacement input device. The host, upon receipt of the updated displacement, determines new projected future positions for the displacement input device at multiple future times.

In one embodiment, the host (or host dongle or driver) determines a starting point of a curve for new projected future positions from an intermediate interpolation between a projected position from a last received displacement from the displacement input device and the updated actual measured displacement from the displacement input device.

In one embodiment, when an updated displacement is received, a transition curve is created starting from a position on a curve of the projected future positions and intersecting a curve of the new projected future positions. This transition curve smooths out the sawtooth, abrupt transition to a new measured displacement, limiting jitter.

In embodiments, the state of the displacement input device is determined, wherein the state comprises at least a position and velocity (one component for each axis of motion). The state can further include an acceleration in some embodiments. The projected future positions form a curve, which is a straight line in some embodiments.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present disclosure will be more apparent from the following detailed description taken in conjunction with the accompanying drawings, in which:

FIG. 2 is a graph of an example of prior art mouse motion reports over time.

DETAILED DESCRIPTION OF THE INVENTION

Figure 1:
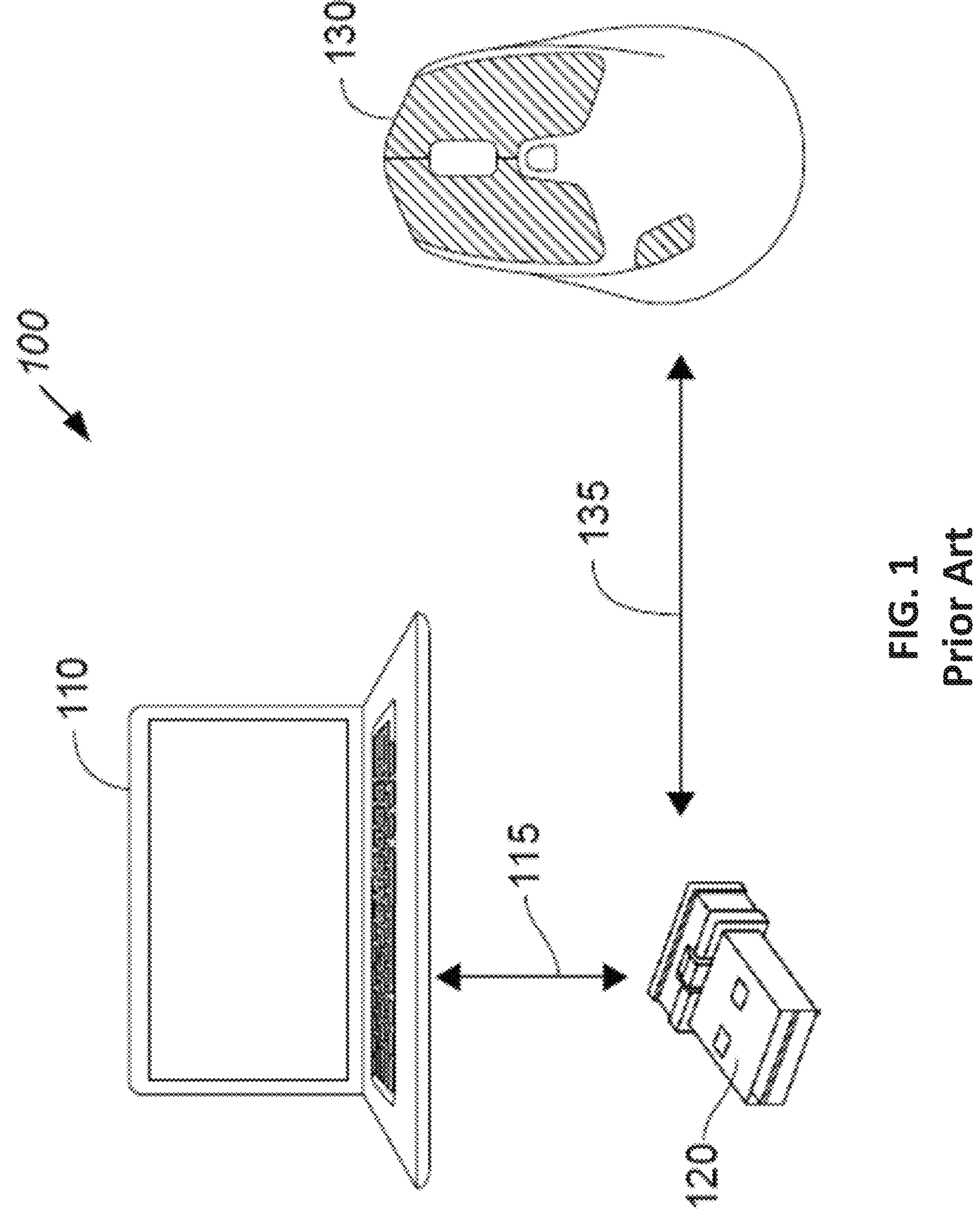
FIG. 1 shows a system including a host computing device that can be coupled to a plurality of peripheral computer devices via a wireless transceiver, according to certain embodiments.

Aspects of the present disclosure relate generally to displacement input devices, and more particularly to systems and methods for increasing an HID report rate while limiting power consumption according to certain embodiments.

In a perfect world, a mouse or other displacement input device should send consistent motion report values through USB (or any other similar communication channel) to the computer at a fixed report frequency. In reality, some time slots have either no mouse motion data or double motion data as illustrated in FIG. 2. Sensor reports don't give the mouse position, but its displacement since the previous report. The measured position is given by the cumulative sum of the displacements. Likewise, the position calculated by the model must be converted back to displacements when the motion data is sent to the computer through, e.g., a USB channel.

FIG. 2 is a graph of an example of prior art mouse motion reports over time. The Y axis shows the motion reports and the X axis is time. Only one axis of the x, y motion report is shown for simplicity. The first bar in each pair is a motion report from the sensor in the mouse (e.g., report 202), and next bar is the report (e.g., 204) as transmitted to a host at a periodic sampling time 206. For example, the motion sensor reports can be sent wirelessly by the mouse to a USB receiver dongle connected to the host, and then over a USB connection of the host to its processor. Sensor report 208 is an example of a report received after a periodic sampling time 210, such as the sampling time of the USB bus at the host receiver. Since the sensor report is late, no mouse report is sent. The next mouse report 212 will then include two sensor reports, 208 and 214.

Most 2D tracking sensors indeed calculate mouse displacements at varying frequencies. The exact timing depends on various parameters such as mouse speed, jitter, surface darkness, or temperature. Fully synchronizing the polling of the sensor (by the mouse MCU) with the sensor report rate is therefore non-trivial and usually not achievable. The asynchronicity between the two creates beats and other related artifacts. For wireless mice, there is additional beat and temporal jitter in the USB reports sent to the computer because RF reports are not perfectly synchronized with USB reports as they use different clocks. To get rid of those irregularities, some manufacturers smooth the sensor data, but this also adds lag to the response and is therefore not desirable, particularly in gaming mice.

In the following description, various examples of increasing an HID report rate while limiting power consumption are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to various novel communication protocols having a method for increasing an HID report rate while limiting power consumption.

A method and apparatus are described for communications between a displacement input device and a host. Instead of constantly transmitting device displacement information at a high rate, which consumes significant power, the number of transmissions is reduced. Instead of using actual sensed displacements, at the host, predicted positions are determined and sent to the display based on projections from the last received measured state (e.g., position and velocity) of the HID displacement. With the position and velocity, the positions between transmissions of actual position can be determined. When a next transmission is received, the projected positions can be modified based on the new information. A physical state model in certain embodiments consists of the position, velocity (1st time derivative of position), and in some cases acceleration (2nd time derivative of position) of the mouse, for each motion axis (e.g., X & Y & possibly Z).

In further embodiments, it is recognized that the transition from the last projected position to a new measured position can produce position jitter. To partly address this, the new measured displacement is not directly used. Rather, an interpolation (weighted average) between the projected position and the measured displacement is used to generate a new projection line (or curve). A transition line or curve is then calculated to intersect with the new projection line/curve, rather than just jumping to the new projection, which itself would cause position jitter.

Wireless Input Device and Host System

FIG. 1 shows a system 100 including host computing device 110 that can be coupled to a plurality of peripheral computer devices 130 (e.g., a computer mouse) via a wireless transceiver 120, according to certain embodiments. Host computer 110 may include any suitable computing device, such as a desktop computer, laptop computer, tablet computer, wearable computing device (e.g., head-mounted display, smart watch, etc.), entertainment/infotainment system, vehicle computing systems, or other suitable computing device. Although one host computing device is shown, one of skill in the art will appreciate that multiple computing devices may be used in the embodiments that follow. For example, each peripheral device may be coupled to multiple host computing devices (e.g., but one at a time). Transceiver 120 can be coupled to host computer via a wired or hard-wired connection.

In some embodiments, transceiver 120 may be a USB transceiver (also referred to as a "dongle" herein) that is socketed in and coupled to host computer 110. In some embodiments transceiver 120 may be wirelessly coupled to host computer 110 using a Bluetooth®, BLE® or other wireless protocol over a communication interface 115. In some embodiments mouse 130 may be required to go through an initial "pairing" process with transceiver 120 where they exchange data that can include sharing their addresses, names, and profiles which can be stored in memory. The devices can also share a common secret key, which allows them to "connect" whenever they're within communications range in the future. When a peripheral device is connected to the transceiver, bidirectional communications between the devices can proceed using a data construct.

In some embodiments, transceiver 120 and mouse 130 (and other peripheral devices, not shown) communicate with each other via a piconet 135, which can also be referred do as a wireless communications path. In FIG. 1 piconet 135 is illustrated as wireless communication path 135 between transceiver 120 and mouse 130. The piconet can be a packet-based protocol. A piconet can include a master device (transceiver 120) and one or more servant devices (e.g., mouse 130). The master device coordinates communication throughout the piconet. The master device can send data to any of its servant devices and request data from them as well. Servant devices are allowed to transmit to and receive from their master.

Mouse 130 can alternately be any suitable computer peripheral device which provide displacement information. For instance, the peripheral device may be a computer mouse, a gamepad, steering wheel, trackball, digital pen, or other displacement input device. Each peripheral device can be wirelessly coupled to host computer 110 using a communications protocol that manages the report rate of the peripheral devices. One of ordinary skill in the art with the benefit of this disclosure would appreciate the many modifications, variations, and alternative embodiments thereof. A displacement input device may be a computer peripheral device, and may be referred to as either herein, as well as a "peripheral input device," "peripheral," or the like. The majority of the embodiments described herein generally refer to computer mouse 130, however it should be understood that a computer peripheral device can be any suitable input/output (I/O) device (e.g., user interface device, control device, input unit, or the like) that may be adapted to utilize the novel embodiments described and contemplated herein.

Physical State Model

Embodiments predict and display projected displacement positions from a state of a displacement input device calculated from a last position. The state has elements according to a state model. The state model elements are:

X position: x Y position: y

X velocity: $v_x=dx/dt$ Y velocity: $v_y=dy/dt$ (X acceleration: $a_x=d^2x/dt_2$) (Y acceleration: $a_y=d^2y/dt_2$)

Note the velocity is dependent on the vectors dx, dy, which provide both the amount of displacement and the direction.

Having acceleration in the model could be useful if there are relatively long periods of time without sensor reports and if the actual mouse acceleration is significant. Otherwise, a simpler model with only position and velocity (but no acceleration) is sufficient, with little or no loss of precision. Since sensor reports are typically spaced by only a few milliseconds or less, the simpler model is sufficient for most present-day implementations.

Note that higher-order time derivatives (e.g., jerk) could optionally be added to the model. However, in most present-day embodiments they are not needed since the acceleration and even the velocity are almost constant during short periods of time and human beings are not capable of movements with big jerk anyway. Jerk (also known as jolt) is the rate of change of an object's acceleration over time. Like velocity and acceleration, it is a vector quantity (having both magnitude and direction).

The physical model describes the state of the mouse at any given time. The position vs. time is given by the well-known equations of motion. The highest-order time derivative is considered constant (e.g., constant velocity for a model with only position and velocity, or constant acceleration for a model with position, velocity and acceleration).

Physical state model with constant velocity (coasting model):

$$x(t)=x_0+v_{x,0}\cdot\Delta t$$

$$y(t)=y_0+v_{y,0}\cdot\Delta t$$

Physical state model with constant acceleration (ballistic model):

$$x(t)=x_0+v_{x,0}\cdot\Delta t+\tfrac{1}{2}\cdot a_{x,0}\cdot\Delta t_2$$

$$y(t)=y_0+v_{y,0}\cdot\Delta t+\tfrac{1}{2}\cdot a_{y,0}\cdot\Delta t_2$$

where $\Delta t=t-t_0$

These equations allow one to predict (extrapolate) the position of the mouse pointer while no measurement data is available from the sensor.

Figure 3:
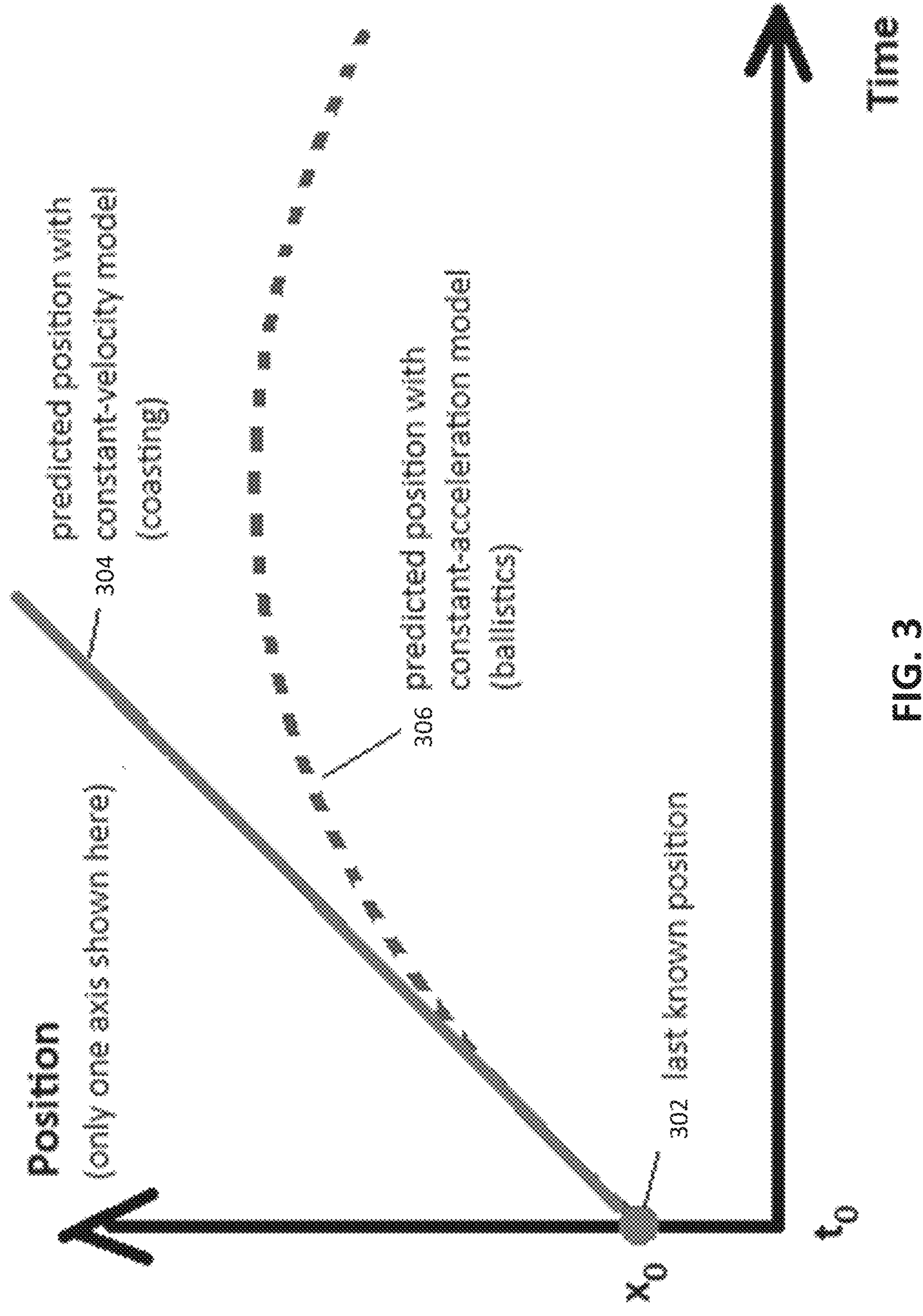
FIG. 3 is a graph of predicted position based on velocity or acceleration, according to certain embodiments.

FIG. 3 is a graph of predicted position based on velocity or acceleration, according to an embodiment. Point 302 is the last known position of the displacement of the displacement input device. Line 304 is an example of the predicted positions over time with a constant velocity model (coasting). Line 306 is an example of the predicted position over time for a constant acceleration model (ballistics). As can be seen, the constant velocity model provides a straight line, while the constant acceleration model provides a curved line.

State Model Update

The state model is of course imperfect since the actual mouse motion-controlled by the person moving the mouse—can be any trajectory and typically doesn't have a constant velocity or a constant acceleration. The model will therefore eventually significantly deviate from the actual motion if it is not updated regularly. To mitigate this deviation as much as possible, the model is updated whenever new measurement data is read from the sensor.

There are many ways to perform the update and merge the predicted (extrapolated) position with the measured displacement given by the sensor. Many such methods are well-known from literature: Kalman filters, IIR filters, FIR filters, alpha-beta-(gamma) filters, etc. Some of those filters update the state model by adding a fraction of the difference between the measured displacement and the predicted position. This difference is usually called the innovation or the residual, and the multiplicative factor, the gain.

Update Equations $$r_x=x_{measured}-x_{predicted}\; r_y=y_{measured}-y_{predicted}$$

$$x\rightarrow x+\alpha\cdot r_x\; y\rightarrow y+\alpha\cdot r_y$$

$$v_x\rightarrow v_x+\beta\cdot r_x\; v_y\rightarrow v_y+\beta\cdot r_y$$

$$(a_x\rightarrow a_x+\gamma\cdot r_x)(a_y\rightarrow a_y+\gamma\cdot r_y)$$

where the α, β and γ gains are typically in the range (0, 1] and can be either constant or dynamically set (as in Kalman filters). The equations presented here typically use dimensionless units, such as pixels, pixels/sampling rate, pixels/(sampling rate)$^2$ for position, velocity and acceleration respectively. One skilled in the art would understand that the β gain can contain a time value converting the innovation (a difference in position) to a velocity ($\beta=\beta'/\Delta t$). Likewise, the y gain can contain a time value squared converting the innovation to an acceleration ($\gamma=\gamma'/\Delta t_2$).

Figure 4:
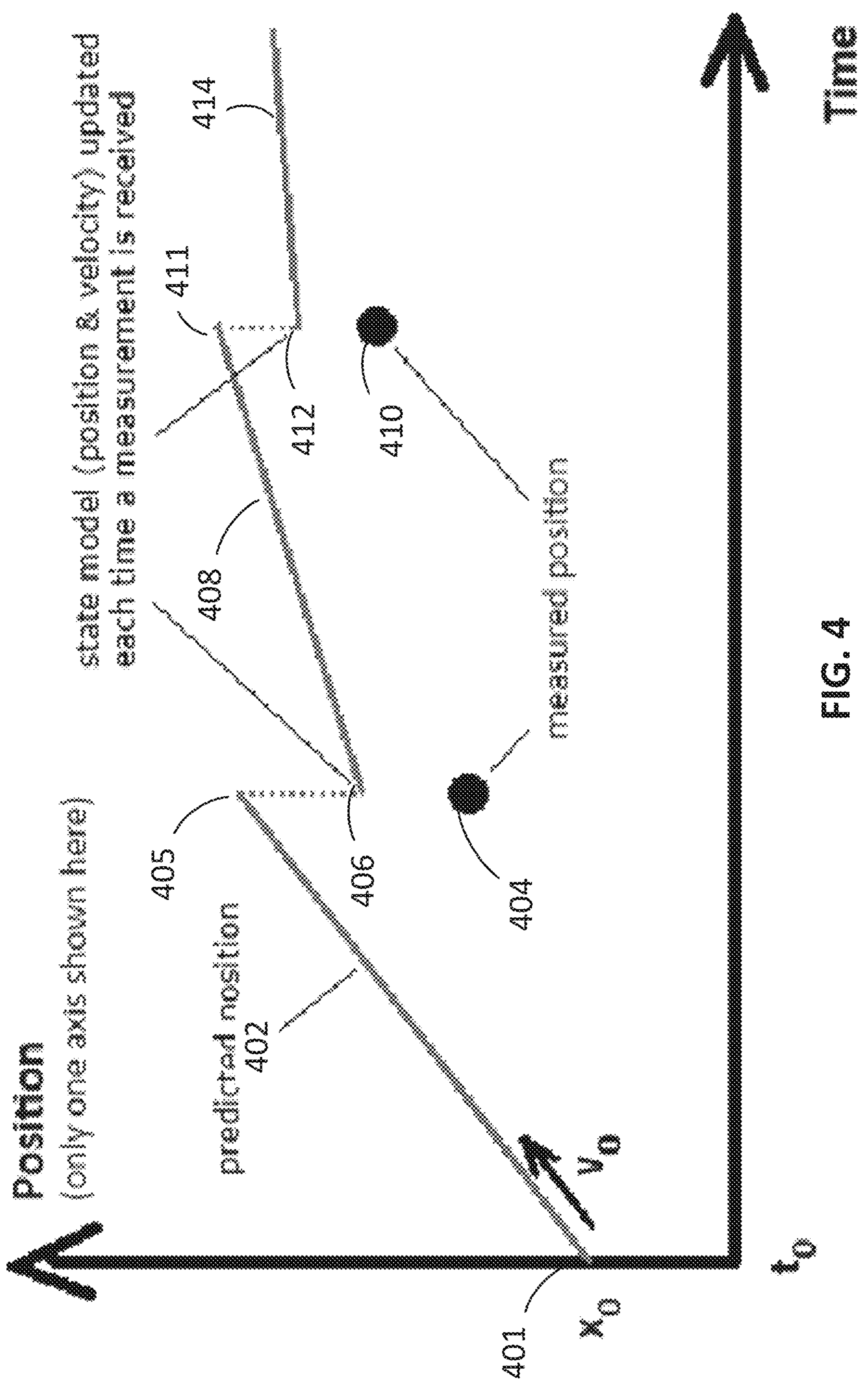
FIG. 4 is a graph of an example of updated predicted positions based on a constant velocity (coasting) state model, according to an embodiment.

FIG. 4 is a graph of an example of updated predicted positions based on a constant velocity (coasting) state model, according to an embodiment. Only the x displacement is shown, not the y displacement, for simplicity of illustration. From an initial measured position 401 ($X_0$), a first line 402 of predicted future positions is generated. At multiple points along this line, new position reports are provided to the host, as if new measured displacements were received from the displacement input device. At a later point in time, a new measured displacement 404 is received. Instead of using that displacement as the starting point for a new prediction line, an interpolation is done between position 404 and a predicted position 405 at that time, to give a new starting position 406. The interpolation can be done with any number of filters (Kalman, etc.) or can simply be halfway between the two points. Alternately, it could simply be¼,¾,⅔ or any other fraction between the two points. From position 406, a new predicted position line 408 is generated. Note that this line has a lower slope than line 402, since line 402 overshot the change in position from point 401 to point 404.

A subsequent measured displacement 410 is received in the FIG. 4 example. Again, an interpolation is done between point 410 and predicted point 411 at that time, to give a new starting point 412. A new prediction line 414 is then generated. Note that this line has a lower slope than line 408, since line 408 continued to overshoot the change in position. In one embodiment, the interpolation 412 is simply the mid-point between point 410 and point 411.

Advantages

Such a physical state model as described herein addresses the different issues mentioned in the Background sections above:

1. An updated position value and the corresponding displacement can be calculated anytime. There is no need to wait for the next motion report from the sensor. There is therefore no need to increase the sensor minimum report rate. This helps keep the sensor power consumption low. Even more so, the power consumption could possibly be reduced if using lower sensor report rates. Moreover, since the sensor is let free to operate at its preferred report rate and not forced to a high rate, the reported displacements have less noise. For example, the minimum flash rate of the 2D tracking sensor in mice of a typical 1 kHz value can be used, rather than increasing to 2, 4, or even 8 kHz. This allows an advanced sensor to be flashed less often, or an older, less expensive sensor can be used.
2. The model can be implemented with fixed-point or floating-point arithmetic, which increases the effective spatial resolution since fractional (non-integer) positions can be calculated. The spatial resolution (DPI) could thus be increased by several orders of magnitude.
3. The model yields a better effective precision as the jitter, beat, and double reports from the reading of the sensor are smoothed out without adding lag to the system.

Improved Model

Each time the state model is updated with measurement data (not necessarily at a fixed rate), the predicted position jumps. The position given by the state model thus follows a sawtooth pattern, as can be seen in FIG. 4 with the jumps from position 405 to 406 and position 411 to 412.

The filters mentioned earlier (Kalman filters, etc.) are typically used to smooth measurement data rather than predict intermediate values between measurements. The discontinuities (jumps) in the sensor state position are therefore inconspicuous. It would be desirable, however, in this application to know the position anytime, in particular in between sensor measurements. Although the jumps are usually small and happen quite fast, possibly faster than what most humans can perceive, the sawtooth pattern might still be perceived by some people, creating unwanted hiccups in the trajectory. In particular, some motion reports would be sent with the opposite sign to the general mouse direction, which would give the improper feeling that one step back is regularly taken after several steps forward. To smooth those jumps, in some embodiments a solution is to distribute each jump across the next few mouse reports using a transition mode, typically over the time it takes to get a new sensor report.

The transition mode is based on any of the well-known filters mentioned before (which show a sawtooth pattern), but the underlying state model is not directly used to report the position of the mouse—it is used instead to calculate the next target position for the improved model whenever a new measured displacement is reported by the sensor. The target position is the predicted position (using the underlying state model) at the time of the last mouse output report before the next expected sensor update. In other words, the improved model is designed in such a way that it catches up with the position of the underlying state model one time step before new measurement data can be read from the sensor.

Figure 5:
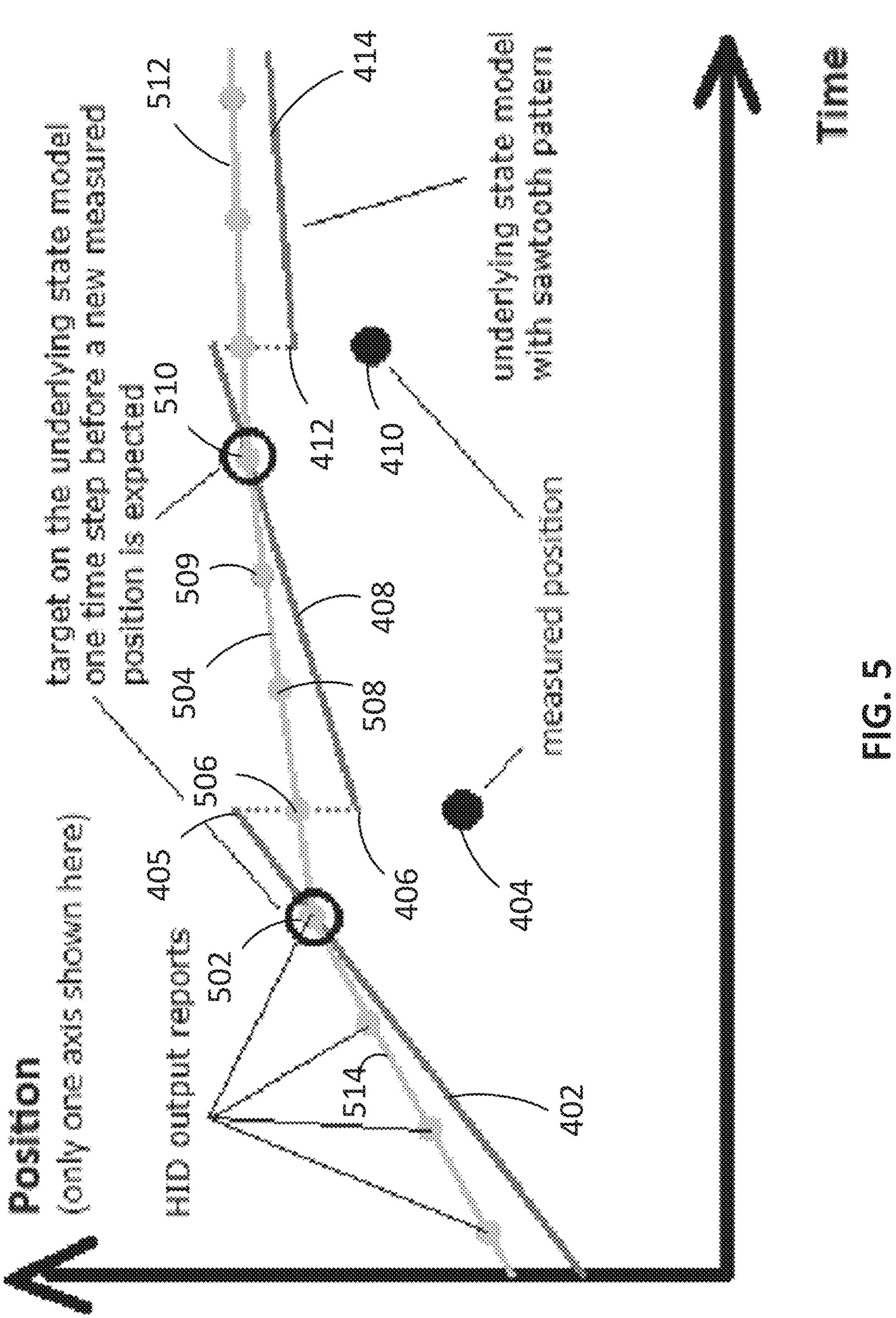
FIG. 5 is a graph illustrating the smoothing of the transition between predicted trajectories, according to certain embodiments.

FIG. 5 is a graph illustrating the smoothing of the transition between predicted trajectories, according to an embodiment. When new measured displacement 404 is received, as described with respect to FIG. 4, a new starting point 406 for the projected future positions is determined and a new projected line 408 is established. However, as noted above, this will give a sawtooth pattern with abrupt changes. Instead, in one embodiment, a transition projected line 504 is calculated. It starts from the last predicted position 502 before measured displacement 404, and extends to intersect projection line 408 at the last time period before the next measured displacement is expected. Thus, the line 504 is drawn to intersect projected line 408 at position point 510. Last position 502 is used instead of the current (wrong) predicted position 405, because this gives a new position 506 which is less of an abrupt change, but will intersect the new prediction before the next measured displacement is received. Predicted mouse reports are then reported to the host with positions 506, 508, 509 and then 510.

The process is repeated when the next measured displacement 410 is received. A transition prediction line 512 is drawn between the previous predicted position 510 and a last position (not shown) on line 414 (not shown) before the next measured displacement is received. Note that if the mouse was already moving at the start of the graph, a transition prediction line 514 would be used instead of prediction line 402. In alternate embodiments, different points on the prediction lines could be used for the starting and intersecting points of the transition prediction lines. For example, the selection of starting and intersecting point could be made dependent upon how far off the actual measured displacement is from the predicted position. In one embodiment, a shorter transition line could be used if the measured and predicted positions are very close.

Note that the sensor reports don't give the mouse position, but its displacement since the previous report. The measured position is given by the cumulative sum of the displacements. Likewise, the position calculated by the model must be converted back to displacements when the motion data is sent to the computer through USB.

Sequence

Figure 6:
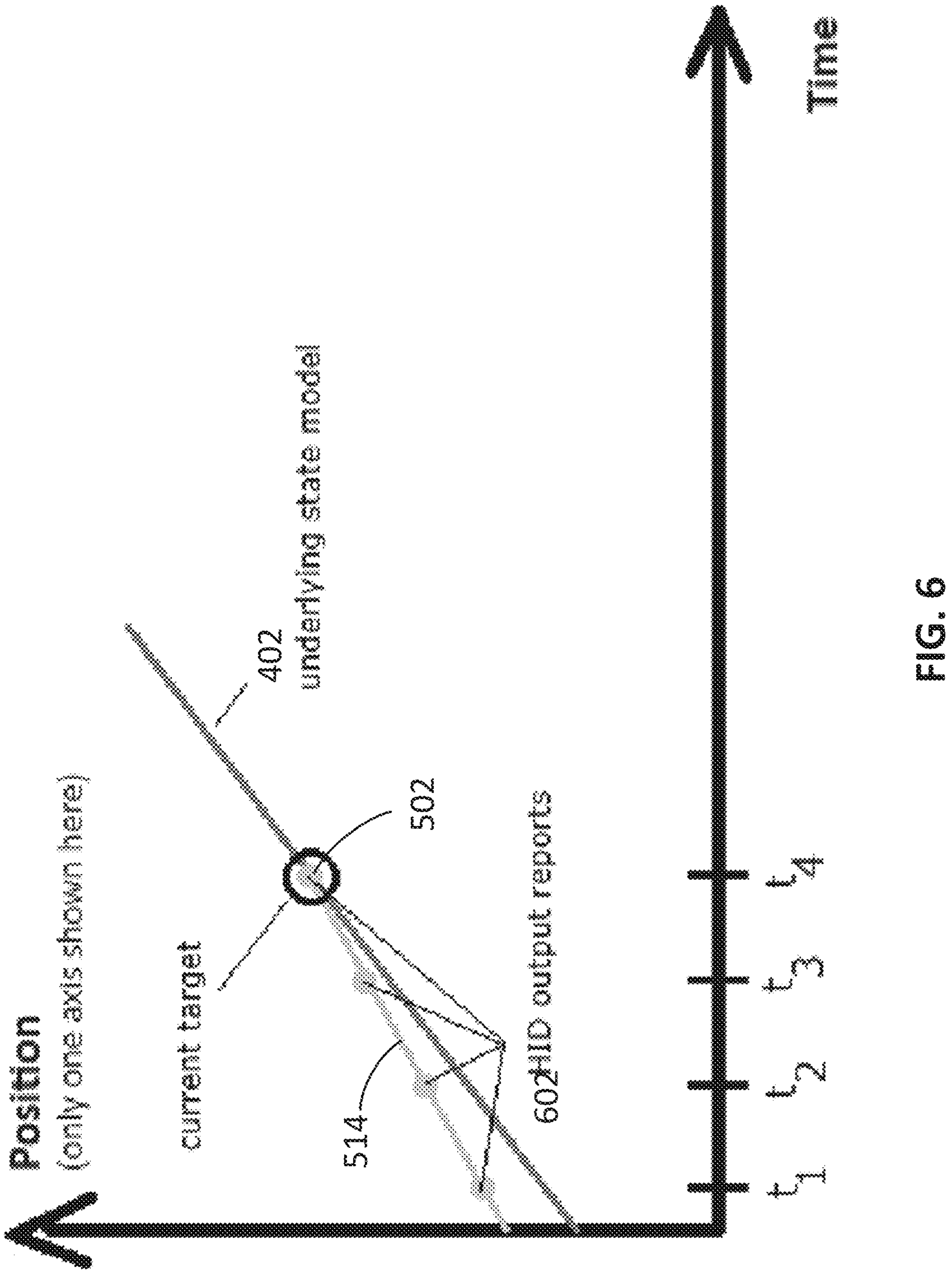
FIGS. 6-10 illustrate the series of steps that achieve the graph of FIG. 5, according to certain embodiments.

FIGS. 6-10 illustrate the series of steps that achieve the graph of FIG. 5, according to embodiments. FIG. 6 shows a previously calculated predicted position line 402, based on the last received state model. A transition line 514 is drawn from the last predicted line (not shown) to an intersection point 502 at time $t_4$. A next measured displacement, and state, is expected at time $t_5$, so $t_4$ is the last time period before this. Without having a measured mouse displacement, predicted mouse output reports 602 are provided at times $t_1$, $t_2$ and $t_3$, as well as $t_4$.

Figure 7:
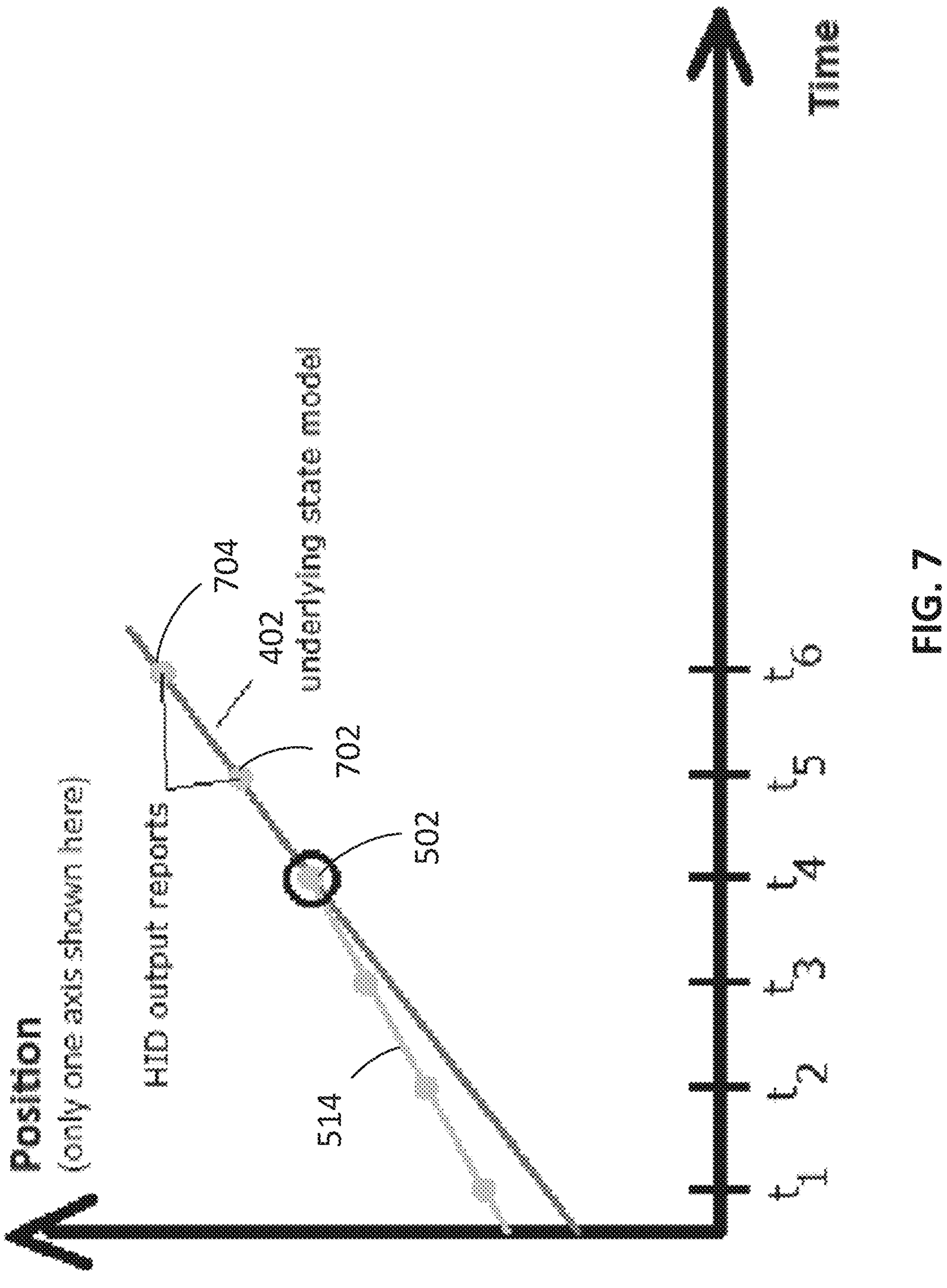

FIG. 7 illustrates the situation where a measured displacement isn't received by time $t_5$, as expected. This step should not be necessary most of the time. Ideally, after the target is reached (at $t_4$ in our example), a new measurement report should be available from the sensor at the next time slot (i.e., at $t_{(4+1)}=t_5$), in which case we go directly to the next step illustrated in FIG. 8. However, there can be jitter and measurement reports from the sensor can be delayed. If this occurs, the mouse output reports should follow the underlying state model and continue on line 402 with reporting point 702. If the measured report still hasn't arrived by time to, point 704 should be used, and so on. If no measured report is received after a designated time, the predictions will stop, and the display will show no further displacement. This can occur, for example, after two expected measurements are missed.

Figure 8:
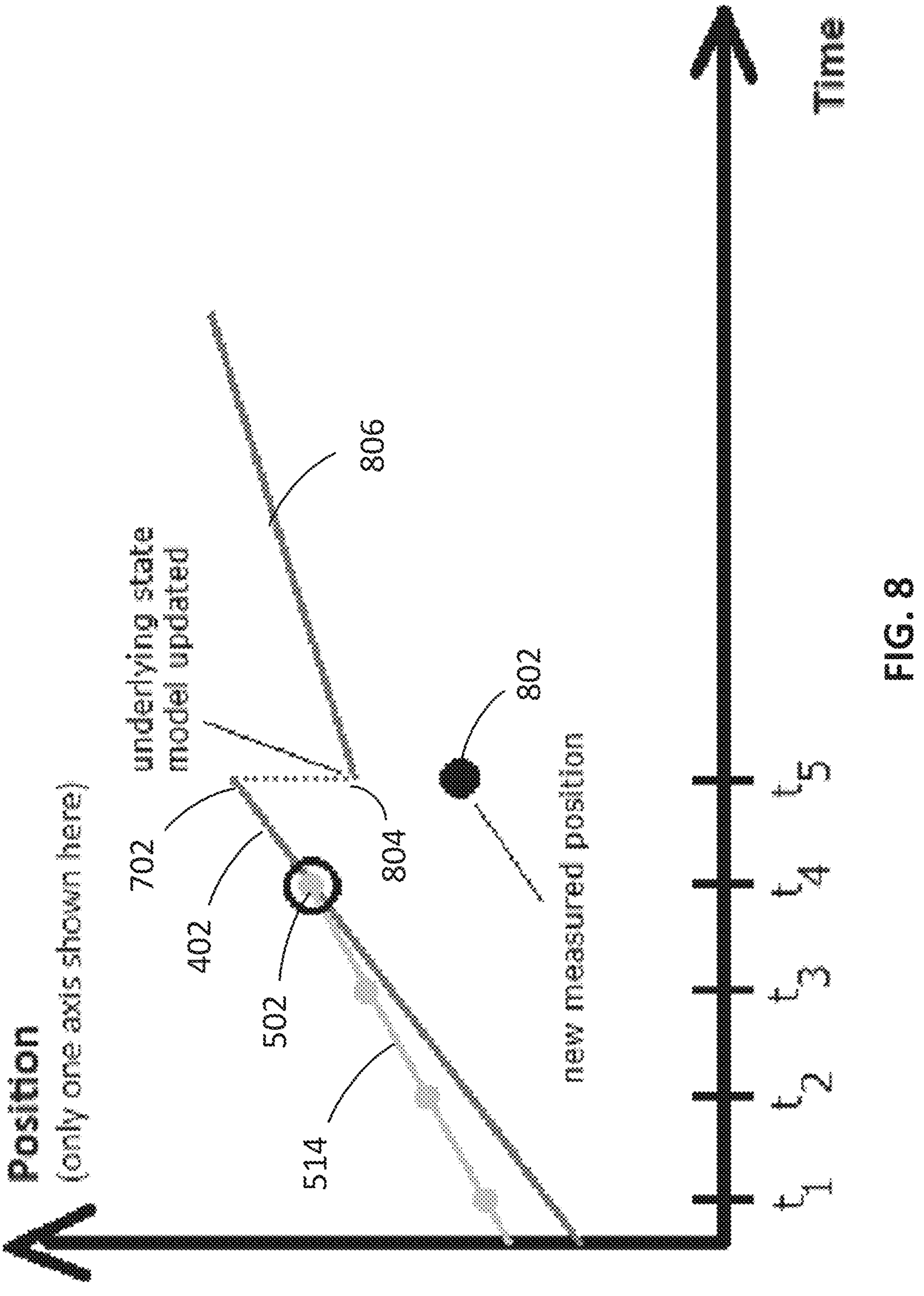

FIG. 8 illustrates the next step whenever a new displacement 802 is reported by the sensor (whether on time, early or late). The state model (position & velocity) is updated using a filter (e.g., an alpha-beta filter or a Kalman filter, interpolating between new measured displacement 802 and predicted position 702 to determine a new start position 804 for prediction line 806. In one embodiment, line 806 can simply be used. In another embodiment, described below, a transition line is calculated to smooth out the sawtooth effect.

Figure 9:
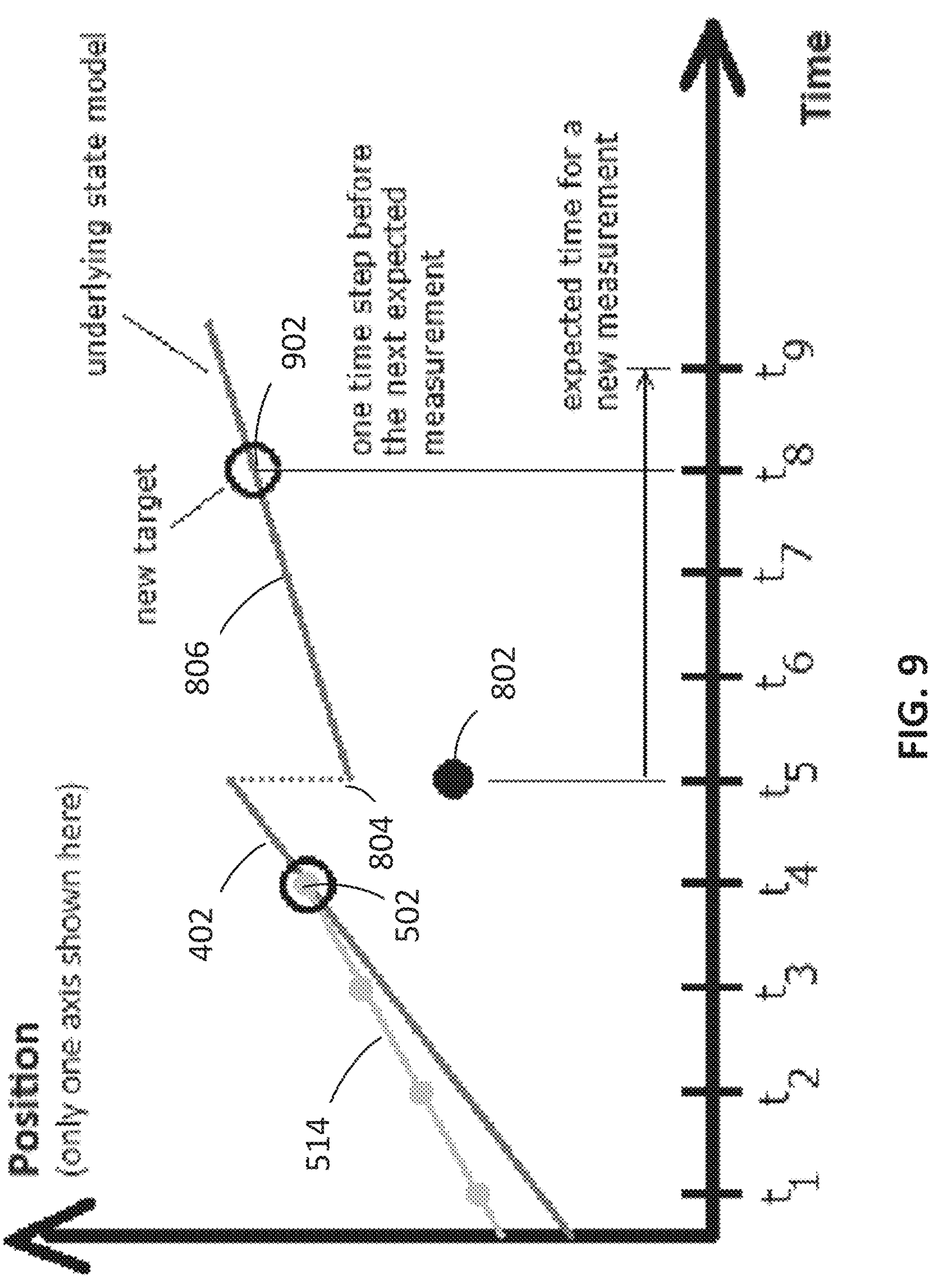

FIG. 9 illustrates the next step after new predicted line 806 is determined, as shown in FIG. 8. A target for the end of a transition line needs to be established. The new target is defined to be the position predicted by the underlying state model one time step before a new measurement is expected (i.e., at $t_{(9-1)}=t_8$ in our example). Thus, the target point 902 at time to is chosen.

Figure 10:
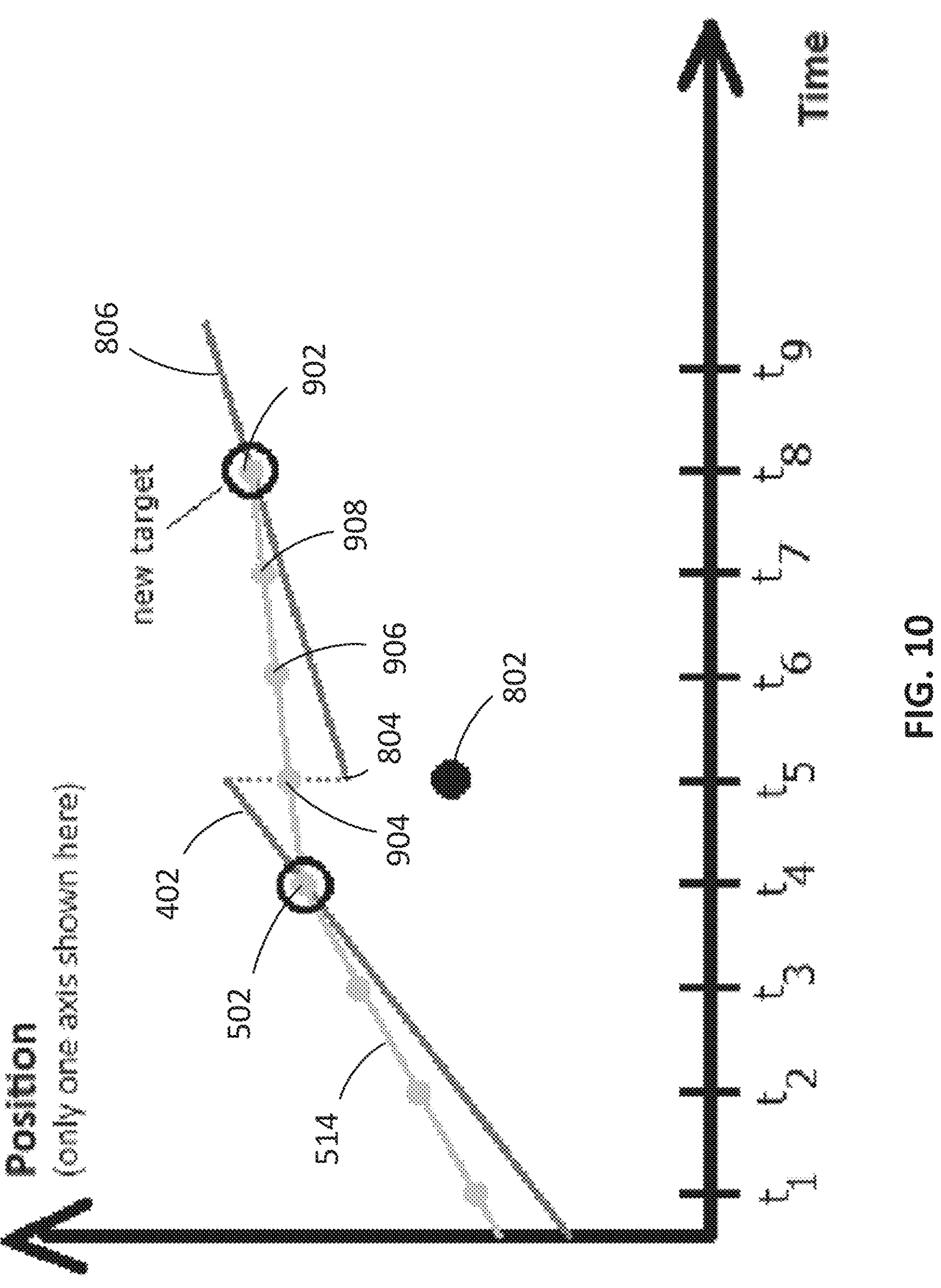

After the transition target point 902 for intersecting with new prediction line is chosen, the transition line is determined, as illustrated in FIG. 10. The start of the transition line is the last reported position 502 before the new measured displacement 802 is received at time $t_5$. The end of the transition line, where it joins new prediction line 806, is point 902, as illustrated in FIG. 10. After this new transition line is determined, the mouse position at time $t_5$ is reported as position 904 on line 806, not measured displacement 802 nor the start of the prediction line, position 804. For subsequent time periods, while no new measured displacement is received, the mouse position is reported as 906 at time $t_6$, 908 at time $t_7$, and 902 at time to. A new measured displacement is expected at time to, and the process will repeat itself, as illustrated in FIG. 5.

The calculation for the x axis position has been described. A similar calculation is separately done for the y axis position. The two calculations are independent, and thus can be done in parallel. In an alternate embodiment, such as in the case of Kalman filters, one can combine (mix) both x & y data when updating the state mode. This is, however, more computationally intensive. When the displacement is in three dimensions, a z axis positions is also calculated. Three dimensions may be provided for a 3D mouse, a remote control, or other displacement input device.

At power-up, the state model is initialized with null values (zero position, speed, direction, acceleration). The generation of predicted future positions stops if no new actual displacement information is received from the displacement input device for a certain amount of time, such as no new data for two expected measurement times. This will prevent continuing to show movement when the user has stopped moving the displacement input device. In one embodiment, the displayed position can then be returned to the last actual reported measured displacement, or an interpolated position between that displacement and a predicted position.

Location of State Model

In one embodiment, the state model is maintained in a transceiver dongle plugged into a USB port of a host computer. The displacement input device (mouse, joystick, etc.) simply sends via a wireless link the x, y displacement information from a tracking sensor in the displacement input device. The dongle then calculates the direction from the previous position, and determines the velocity from the distance from the previous position and the amount of time that has passed. This position, direction and velocity information then comprise the state. Optionally, the acceleration can also be determined.

In an alternate embodiment, the state model is maintained in the host. For example, the dongle could simply pass on the displacement information over a USB wired connection to the host processor, which would then calculate the state and use that information, along with the sequence of calculations described above, to provide predicted displacement positions to a display. In one embodiment, the state and other calculations are performed in a driver for the USB port. Alternately, in any of the embodiments, the sequence of operations using the state (determining a new predicted line and a transition line, and selecting position points on the lines) could be performed in a separate location from where the state is determined. For example, the state could be determined in the displacement input device, and the sequence could be determined in the dongle. Alternately, the state could be determined in the dongle, and the sequence could be determined in the host. Portions of the state and the sequence could also be done in separate locations. For example, both position and velocity could be determined in the displacement input device, with the rest of the state (direction) determined in the dongle. The determination of the new predicted line could be done in the dongle, and the host or host driver could determine the transition line.

In embodiments, the wireless report rate from the displacement input device, and the USB sampling rate at the host computer are asynchronous. However, the USB sampling time can be synchronized with the refresh rate of the computer.

In embodiments, the displacement input device is one of a computer mouse, a trackball, a joystick, a gamepad, a steering wheel or a touchpad. The position is the position of the ball of the trackball, or the orientation of the stick for the joystick. The data from a sensor in the displacement input device can, for example, be x-y displacement data, z-displacement data, wheel rotation data, trackball rotation data, joystick or mini-joystick data, D-pad data, accelerometer data or tilt sensor data.

Flowchart

Figure 11:
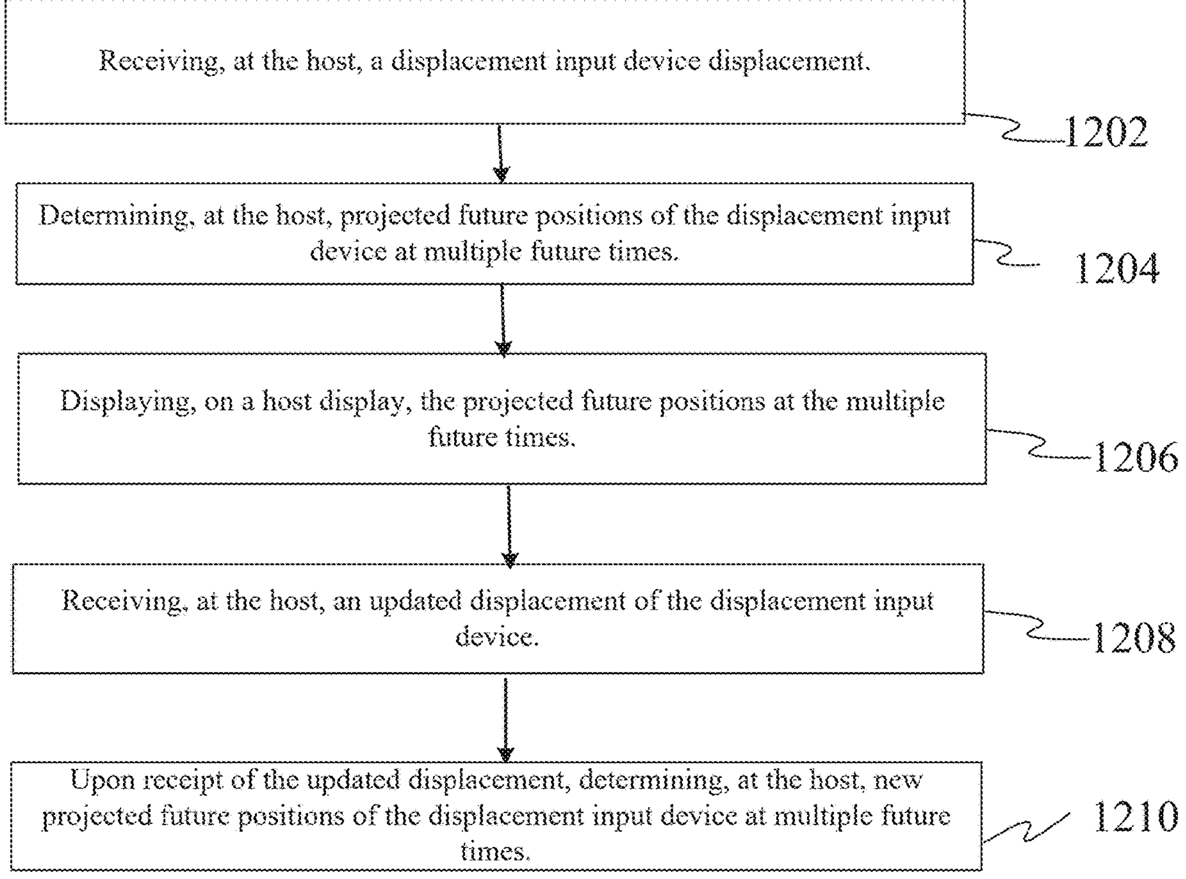
FIG. 11 is a flowchart illustrating a method for increasing an HID report rate while limiting power consumption, according to certain embodiments.

FIG. 11 is a flowchart illustrating a method for communications between a displacement input device and a host, according to certain embodiments. Step 1202 is receiving, at the host, a displacement input device displacement. Step 1204 is determining, at the host, projected future positions of the displacement input device at multiple future times. Step 1206 is displaying, on a host display, the projected future positions at the multiple future times. Step 1208 is receiving, at the host, an updated displacement of the displacement input device. Step 1210 is, upon receipt of the updated displacement, determining, at the host, new projected future positions of the displacement input device at multiple future times.

Peripheral Device

Figure 12:
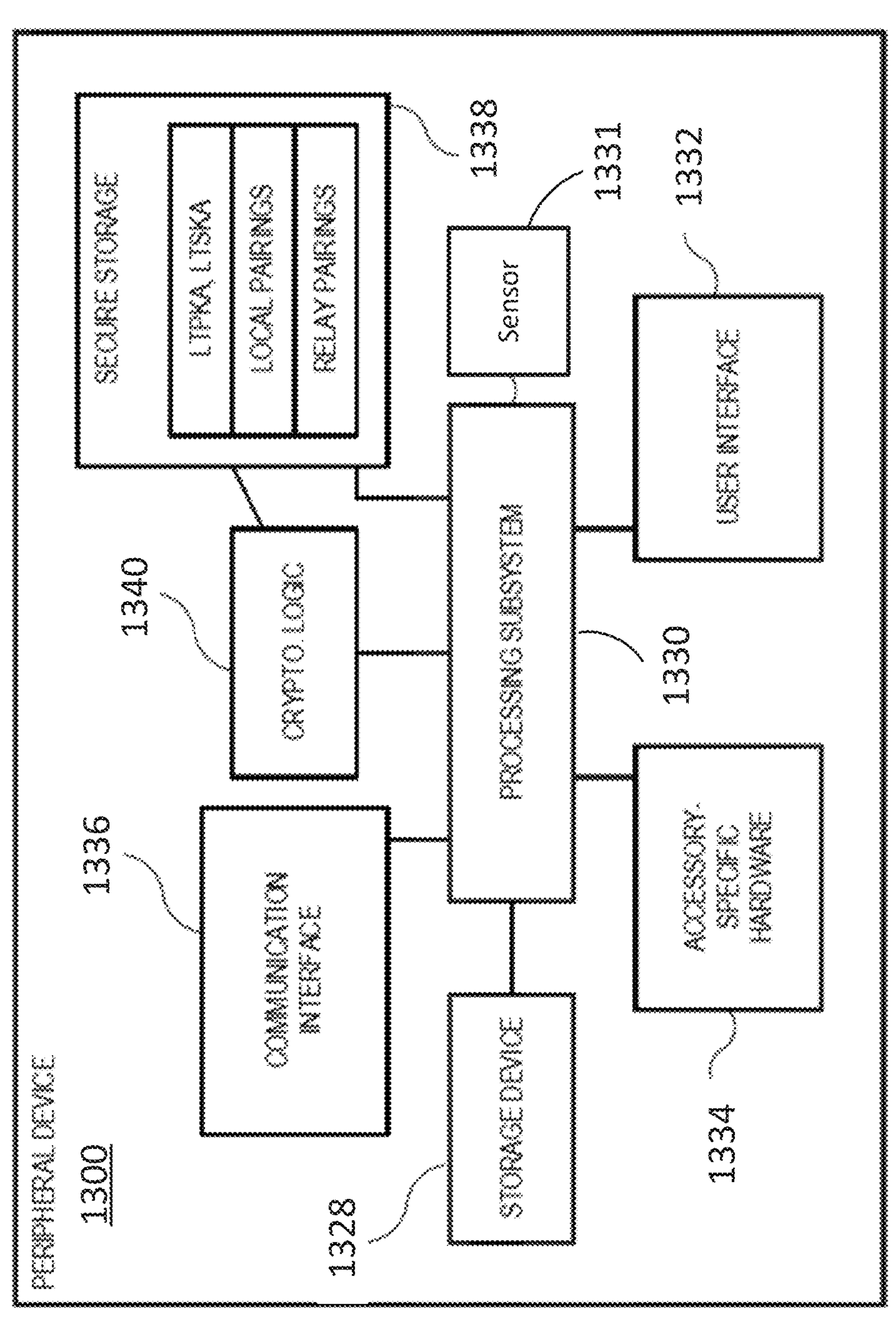
FIG. 12 shows a simplified block diagram of an example HID peripheral device, according to certain embodiments.

FIG. 12 shows a simplified block diagram of an example HID peripheral device 1300, according to certain embodiments. In embodiments, the HID peripheral device is a displacement input device such as a computer mouse, a trackball, a joystick, a gamepad, a steering wheel or a touchpad. Peripheral device 1300 can implement any or all of the peripheral device functions, behaviors, and capabilities described herein, as well as other functions, behaviors, and capabilities not expressly described. Peripheral device 1300 can include storage device 1328, processing subsystem 1330, user interface 1332, peripheral device-specific hardware 1334, communication interface 1336, secure storage module 1338, and cryptographic logic module 1340. Peripheral device 1300 can also include other components (not explicitly shown) such as a battery, power media access devices, and other components operable to provide various enhanced capabilities.

Peripheral device 1300 is representative of a broad class of devices that can be used in conjunction with a host device and include displacement data, such as but not limited to mice, keyboards with scrolling wheels and/or cursor buttons, trackballs, gamepads, steering wheels, remote controls, pointing devices, digital pens and the like. Various accessories may include components not explicitly shown in FIG. 12, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1328 can be implemented, e.g., using disk, flash memory, or any other non-transitory storage medium, or a combination of media, and can include volatile and/or non-volatile media. In some embodiments, storage device 1328 can store one or more programs (e.g., firmware) to be executed by processing subsystem 1330, including programs to implement various operations described above as being performed by a peripheral device, as well as operations related to particular peripheral device behaviors. Storage device 1328 can also store a peripheral device object or peripheral device definition record that can be furnished to host devices, e.g., during device discovery. Storage device 1328 can also store peripheral device state information and any other data that may be used during operation of peripheral device 1300. Storage device 1328 can also store program code executable to communicate with a transceiver 120, as shown in FIG. 1, e.g., as described above.

Processing subsystem 1330 can include, e.g., one or more single-core or multi-core microprocessors and/or microcontrollers executing program code to perform various functions associated with peripheral device 1300. For example, processing subsystem 1330 can implement various processes (or portions thereof) described above as being implemented by a peripheral device, e.g., by executing program code stored in storage device 1328. Processing subsystem 1330 can also execute other programs to control other functions of peripheral device 1300. In some instances, programs executed by processing subsystem 1330 can interact with a host, e.g., by generating messages to be sent to the host and/or receiving messages from the host. In some instances, the messages can be sent and/or received using a transceiver 120, as shown in FIG. 1, as described above.

Sensor 1331 is the displacement sensor. This can be an optical sensor mounted on the bottom of a mouse. Alternately, it could be a rotational sensor in a trackball, or a tilt sensor in a gamepad. The sensor can use optics, magnetism, or any other technology. Any sensor that measures displacement could be used. Alternately multiple sensors could be used, such as separate sensors for X and Y displacement. Separate displacement reports could be sent for each of the X and Y positions.

User interface 1332 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular peripheral device 1300, a user can operate input devices of user interface 1332 to invoke functionality of peripheral device 1300 and can view and/or hear output from peripheral device 1300 via output devices of user interface 1332. Some accessories may provide a minimal or no user interface. Where the peripheral device does not have a user interface, a user can still interact with the peripheral device using a host (e.g., host 1100).

Peripheral device-specific hardware 1334 can include any other components that may be present in peripheral device 1300 to enable its functionality. For example, in various embodiments peripheral device-specific hardware 1334 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of peripheral device functionality can be supported by providing appropriate peripheral device-specific hardware 1334 and that peripheral device-specific hardware can include mechanical as well as electrical or electronic components.

Communication interface 1336 can provide voice and/or data communication capability for peripheral device 1300. In some embodiments communication interface 1336 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1336 can provide wired network connectivity (e.g., Ethernet) in addition to or instead of a wireless interface. Communication interface 1336 can be implemented using a combination of hardware (e.g., driver circuits, antennas, modulators/demodulators, encoders/decoders, and other analog and/or digital signal processing circuits) and software components. In some embodiments, communication interface 1336 can support multiple communication channels concurrently or at different times, using the same transport or different transports. Thus, for example, peripheral device 1300 can communicate with a host via a local channel at some times and via a relay service at other times.

Secure storage module 1338 can be an integrated circuit or the like that can securely store cryptographic information for peripheral device 1300. Examples of information that can be stored within secure storage module 1338 include the peripheral device's long-term public and secret keys (LTPKA, LTSKA), a list of local pairings (e.g., a lookup table that maps a local host identifier to a host long-term public key (LTPKC) for hosts that have completed a local pair setup or pair add process, e.g., as described above, with peripheral device 1300), and a list of relay pairings (e.g., host Ras and associated access tokens for hosts that have established a relay pairing, e.g., as described above, with peripheral device 1300). In some embodiments, pairing information can be stored such that a local pairing is mapped to the corresponding relay pairing in instances where both a local pairing and a relay pairing with the host have been established. In some embodiments, secure storage module 1338 can be omitted; keys and lists of paired hosts can be stored in storage device 1328.

In some embodiments, cryptographic operations can be implemented in a cryptographic logic module 1340 that communicates with secure storage module 1338. Physically, cryptographic logic module 1340 can be implemented in the same integrated circuit with secure storage module 1338 or a different integrated circuit (e.g., a processor in processing subsystem 1330) as desired. Cryptographic logic module 1340 can include various logic circuits (fixed or programmable as desired) that implement or support cryptographic operations of peripheral device 1300, including any or all cryptographic operations described above. Secure storage module 1338 and/or cryptographic logic module 1340 can appear as a "black box" to the rest of peripheral device 1300. Thus, for instance, communication interface 1336 can receive a message in encrypted form that it cannot decrypt and can simply deliver the message to processing subsystem 1330. Processing subsystem 1330 may also be unable to decrypt the message, but it can recognize the message as encrypted and deliver it to cryptographic logic module 1340. Cryptographic logic module 1340 can decrypt the message (e.g., using information extracted from secure storage module 1338) and determine what information to return to processing subsystem 1330. As a result, certain information can be available only within secure storage module 1338 and cryptographic logic module 1340. If secure storage module 1338 and cryptographic logic module 1340 are implemented on a single integrated circuit that executes code only from an internal secure repository, this can make extraction of the information extremely difficult, which can provide a high degree of security. Other implementations are also possible.

Peripheral device 1300 can be any electronic apparatus that interacts with host 1100. In some embodiments, host 1100 can provide remote control over operations of peripheral device 1300 as described below. For example, host 1100 can provide a remote user interface for peripheral device 1300 that can include both input and output controls (e.g., a display screen to display current status information obtained from peripheral device 1300 and an input control such as a touchscreen overlay to allow changes to the status information). Host 1100 in various embodiments can control any function of peripheral device 1300 and can also receive data from peripheral device 1300, via a transceiver 120, as shown in FIG. 1.

Host

Figure 13:
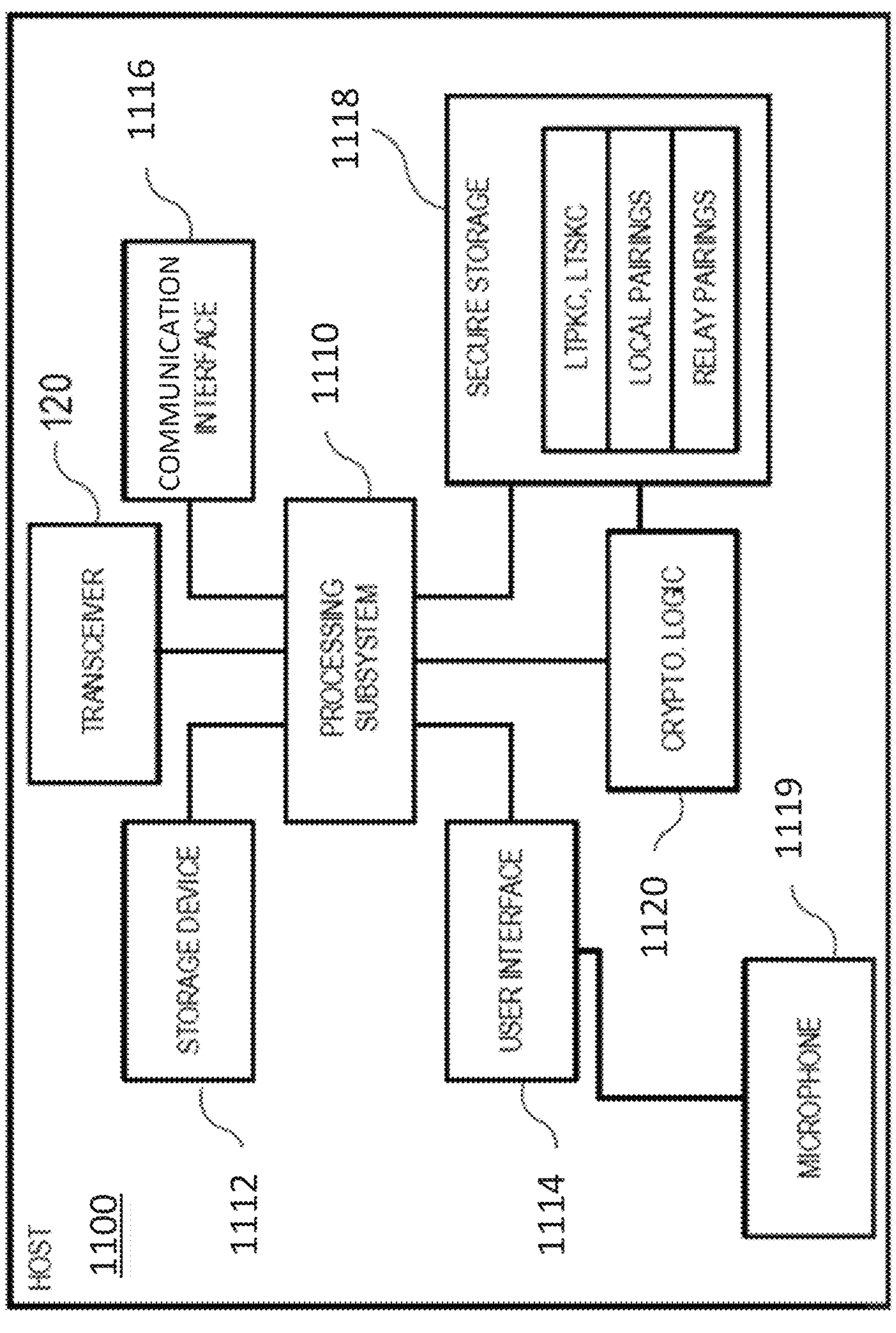
FIG. 13 shows a simplified block diagram of an example host, according to certain embodiments.

FIG. 13 shows a simplified block diagram of an example host 1100, according to certain embodiments. In some embodiments, host 1100 can implement any or all of the functions, behaviors, and capabilities described herein as being performed by a host, as well as other functions, behaviors, and capabilities not expressly described. Host 1100 can include processing subsystem 1110, storage device 1112, user interface 1114, communication interface 1116, secure storage module 1118, and cryptographic logic module 1120. Host 1100 can also include other components (not explicitly shown) such as a battery, power controllers, and other components operable to provide various enhanced capabilities. In various embodiments, host 1100 can be implemented in a desktop computer, laptop computer, tablet computer, smart phone, other mobile phone, wearable computing device, or other systems having any desired form factor. Further, as noted above, host 1100 can be implemented partly in a base station and partly in a mobile unit that communicates with the base station and provides a user interface. Transceiver 120 of FIG. 1 is shown as part of host 1100, and can be removable, such as in a dongle connected to a USB port. In one embodiment, dongle 120 performs the state calculations as described above.

Storage device 1112 can be implemented, e.g., using disk, flash memory, or any other non-transitory storage medium, or a combination of media, and can include volatile and/or non-volatile media. In some embodiments, storage device 1112 can store one or more application and/or operating system programs to be executed by processing subsystem 1110, including programs to implement various operations described above as being performed by a host. For example, storage device 1112 can store a uniform host application that can read a peripheral device description record and generate a graphical user interface for controlling the peripheral device based on information therein. Storage device 1112 can also store program code executable to communicate with a transceiver 120, as shown in FIG. 1, e.g., as described above. Although FIG. 13 illustrates transceiver 120 as a subsystem of host 1100 it is understood that transceiver 120 may be a dongle that is plugged into and electrically coupled with host 1100. Transceiver 120 may contain its own processor for processing received packets as described above, or can be controlled by host processing system 1110 which will perform those functions. In some embodiments, portions (or all) of the host functionality described herein can be implemented in operating system programs rather than applications. In some embodiments, storage device 1112 can also store apps designed for specific accessories or specific categories of accessories (e.g., an IP camera app to manage an IP camera peripheral device or a security app to interact with door lock accessories).

User interface 1114 can include input devices such as a touch pad, touch screen, scroll wheel, click wheel, dial, button, switch, keypad, microphone 1119, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1114 to invoke the functionality of host 1100 and can view and/or hear output from host 1100 via output devices of user interface 1114.

Processing subsystem 1110 can be implemented as one or more integrated circuits, e.g., one or more single-core or multi-core microprocessors or microcontrollers, examples of which are known in the art. In operation, processing system 1110 can control the operation of host 1100. In various embodiments, processing subsystem 1110 can execute a variety of programs in response to program code and can maintain multiple concurrently executing programs or processes. At any given time, some or all of the program code to be executed can be resident in processing subsystem 1110 and/or in storage media such as storage device 1112.

Through suitable programming, processing subsystem 1110 can provide various functionality for host 1100. For example, in some embodiments, processing subsystem 1110 can implement various processes (or portions thereof) described above as being implemented by a host. Processing subsystem 1110 can also execute other programs to control other functions of host 1100, including application programs that may be stored in storage device 1112. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a transceiver 120, as shown in FIG. 1, as described above.

Communication interface 1116 can provide voice and/or data communication capability for host 1100. In some embodiments communication interface 1116 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1116 can provide wired network connectivity (e.g., Ethernet) in addition to or instead of a wireless interface. Communication interface 1116 can be implemented using a combination of hardware (e.g., driver circuits, antennas, modulators/demodulators, encoders/decoders, and other analog and/or digital signal processing circuits) and software components. In some embodiments, communication interface 1116 can support multiple communication channels concurrently or at different times, using the same transport or different transports. Thus, for example, host 1100 can communicate with accessories via a local channel at some times and via a relay service at other times.

Secure storage module 1118 can be an integrated circuit or the like that can securely store cryptographic information for host 1100. Examples of information that can be stored within secure storage module 1118 include the host's long-term public and secret keys (LTPKC, LTSKC), a list of local pairings (e.g., a lookup table that maps a local peripheral device identifier to a peripheral device long-term public key (LTPKA) for accessories that have completed a local pair setup or pair add process, e.g., as described above, with host 1100), and a list of relay pairings (e.g., peripheral device Ras and associated access tokens for accessories that have established a relay pairing, e.g., as described above, with host 1100). In some embodiments, pairing information can be stored such that a local pairing is mapped to the corresponding relay pairing in instances where both a local pairing and a relay pairing with the peripheral device have been established.

In some embodiments, cryptographic operations can be implemented in a cryptographic logic module 1120 that communicates with secure storage module 1118. Physically, cryptographic logic module 1120 can be implemented in the same integrated circuit with secure storage module 1118 or a different integrated circuit (e.g., a processor in processing subsystem 1110) as desired. Cryptographic logic module 1120 can include various logic circuits (fixed or programmable as desired) that implement or support cryptographic operations of host 1100, including any or all cryptographic operations described above. Secure storage module 1118 and/or cryptographic logic module 1120 can appear as a "black box" to the rest of host 1100. Thus, for instance, communication interface 1116 can receive a message in encrypted form that it cannot decrypt and can simply deliver the message to processing subsystem 1110. Processing subsystem 1110 may also be unable to decrypt the message, but it can recognize the message as encrypted and deliver it to cryptographic logic module 1120. Cryptographic logic module 1120 can decrypt the message (e.g., using information extracted from secure storage module 1118) and determine what information to return to processing subsystem 1110. As a result, certain information can be available only within secure storage module 1118 and cryptographic logic module 1120. If secure storage module 1118 and cryptographic logic module 1120 are implemented on a single integrated circuit that executes code only from an internal secure repository, this can make extraction of the information extremely difficult, which can provide a high degree of security. Other implementations are also possible.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 1100 can perform all operations described above as being performed by a media access device and that an implementation of peripheral device 1300 can perform any or all operations described above as being performed by a peripheral device. A proxy, bridge, tunnel, or coordinator can combine components of host 1100 and peripheral device 1300, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

ALTERNATE EMBODIMENTS

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein May be configured differently than described. For example, elements may be added to, removed from, or rearranged compared to the disclosed examples.

What is claimed is:

1. A method for communications between a displacement input device and a host, the method comprising:
- receiving, at the host, a displacement from the displacement input device;
- determining, at the host, projected future positions for the displacement input device at multiple future times;
- displaying, on a host display, the projected future positions at the multiple future times;
- receiving, at the host, an updated displacement from the displacement input device; and
- upon receipt of the updated displacement, calculating a projection curve of projected future positions based on the updated displacement;
- moving a starting point of the projection curve to a midpoint between a position of the updated displacement and a current position based on a previous projected position at the time of the updated displacement;
- determining a transition line between the current position and an intersection point on the projection curve one time step before a new updated displacement measurement is expected; and
- determining, at the host, new projected future positions for the displacement input device at multiple future times along the transition line.

2. The method of claim 1 further comprising determining a state of the displacement input device, wherein the state comprises at least a position and velocity.

3. The method of claim 2 wherein the state further includes an acceleration.

4. The method of claim 1 wherein the projected future positions form a curve.

5. The method of claim 4 wherein the curve is a straight line.

6. The method of claim 1 wherein the displacement input device is one of a computer mouse, a trackball, a joystick, a gamepad, a steering wheel or a touchpad.

7. The method of claim 6 wherein the displacement is data from a sensor in the displacement input device including at least one of x-y displacement data, z-displacement data, wheel rotation data, trackball rotation data, joystick or mini-joystick data, D-pad data, accelerometer data or tilt sensor data.

8. The method of claim 1 wherein the host comprises a USB dongle that is communicatively coupled to the host.

9. The method of claim 1 wherein the host receives the displacements from the displacement input device via a wireless RF link.

10. A method for communications between a displacement input device and a host, the method comprising:
- receiving, at the host, a displacement from the displacement input device;
- determining, at the host, projected future positions for the displacement input device at multiple future times;
- displaying, on a host display, the projected future positions at the multiple future times;
- receiving, at the host, an updated displacement from the displacement input device;
- upon receipt of the updated displacement, calculating a projection curve of projected future positions based on the updated displacement;
- moving a starting point of the projection curve to a midpoint between a position of the updated displacement and a current position based on a previous projected position at the time of the updated displacement;
- determining a transition line between the current position and an intersection point on the projection curve one time step before a new updated displacement measurement is expected; and
- determining, at the host, new projected future positions for the displacement input device at multiple future times along the transition line.

11. The method of claim 10 further comprising determining a state of the displacement input device, wherein the state comprises at least a position and velocity.

12. The method of claim 11 wherein the state further includes an acceleration.

13. The method of claim 10 wherein the host comprises a USB dongle that is communicatively coupled connected to the host.

14. A system for communications between a displacement input device and a host, the system comprising:
- a displacement input device;
- a displacement sensor mounted in the displacement input device;
- a host;
- a processor mounted at the host; and
- a memory coupled to the processor, the memory including non-transitory computer readable medium having stored thereon software instructions that, when executed by the processor, cause the processor to execute steps comprising:
- receiving, at the host, a displacement from the displacement input device;
- determining, at the host, projected future positions for the displacement input device at multiple future times;
- displaying, on a host display, the projected future positions at the multiple future times;
- receiving, at the host, an updated displacement for the displacement input device; and
- upon receipt of the updated displacement, calculating a projection curve of projected future positions based on the updated displacement;
- moving a starting point of the projection curve to a midpoint between a position of the updated displacement and a current position based on a previous projected position at the time of the updated displacement;
- determining a transition line between the current position and an intersection point on the projection curve one time step before a new updated displacement measurement is expected; and determining, at the host, new projected future positions for the displacement input device at multiple future times along the transition line.

* * * * *